Sept. 15, 1959 T. A. ST. CLAIR 2,904,068
APPLIANCE REGULATOR
Filed May 14, 1956 2 Sheets-Sheet 2
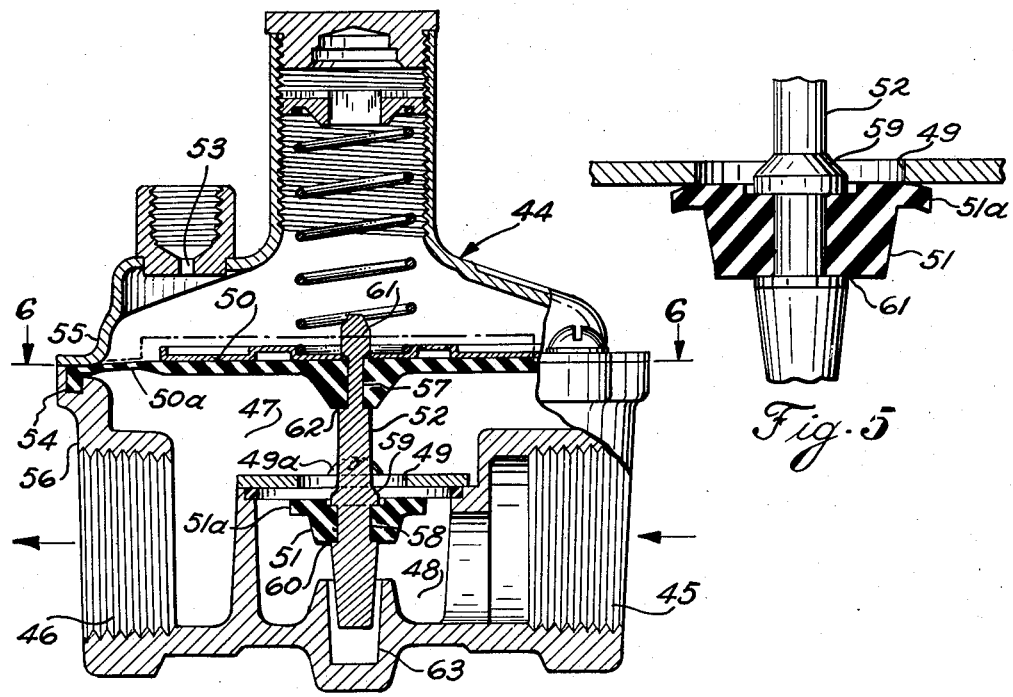
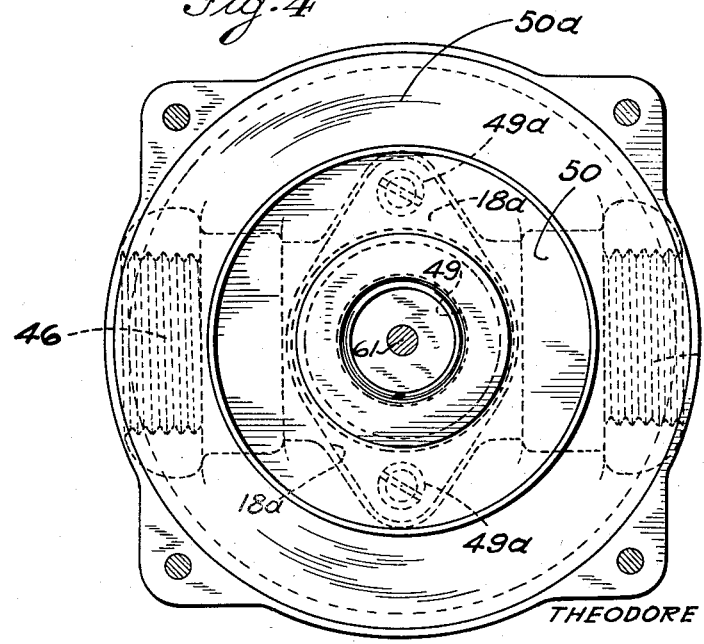
INVENTOR.
THEODORE A. ST. CLAIR
BY
RICHEY, WATTS, EDGERTON & McNENNY
ATTORNEYS United States Patent Office 2,904,068
Patented Sept. 15, 1959

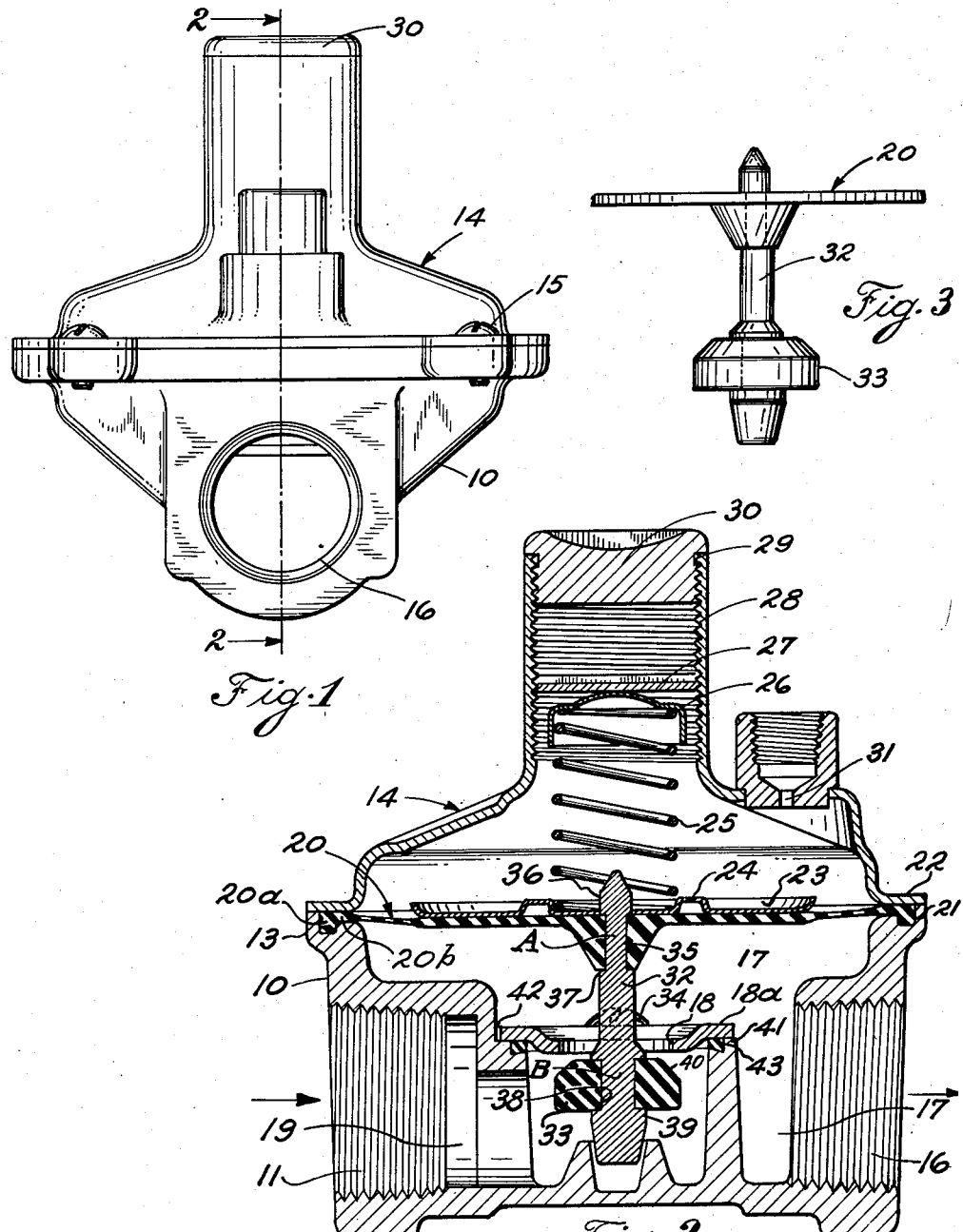

2,904,068

APPLIANCE REGULATOR

Theodore A. St. Clair, South Euclid, Ohio, assignor to The Weatherhead Company, Cleveland, Ohio, a corporation of Ohio Application May 14, 1956, Serial No. 584,538

4 Claims. (Cl. 137—505.41)

This invention relates to fluid pressure regulators of the type employed for supplying fluid at a reduced pressure from a high pressure source. More particularly, the invention relates to the securement of a diaphragm and a valve on a stem member of the regulator.

In order to provide a commercially successful regulator valve, it is necessary that the regulator assembly be adapted to high production and low cost manufacturing processes.

In the regulator of the type to which this invention relates, a diaphragm is provided in the outlet or low pressure chamber and in response to pressure fluctuations in the outlet chamber, the diaphragm moves and controls a valve between the inlet and outlet chambers.

An object of this invention is to provide a simplified structure for regulating fluid pressures.

A particular object of my invention is to simplify and improve the attachment of both the diaphragm and the valve closure to the operating stem of the regulator.

Another object of my invention is to provide an improved flat diaphragm of varying cross-sectional thicknesses which provides the necessary flexibility for pressure regulation.

An object of my invention is to provide an improved valve closure for the valve seat of the pressure regulator.

The foregoing and other objects will become apparent in view of the following description taken in connection with the accompanying drawings, wherein:

Fig. 1 is an end view showing the exterior of the regulator valve;

Fig. 2 is an enlarged vertical section taken on the line 2—2 of Fig. 1;

Fig. 3 shows the stem, diaphragm and valve of the regulator;

Fig. 4 is a vertical section through a pressure regulator having a modified valve closure means;

Fig. 5 is an enlarged sectional view of the valve closure means of Fig. 4 contacting the valve seat; and Fig. 6 is a cross section taken on the line 6—6 of Fig. 4 looking in the direction of the arrows.

Referring to the drawings, the regulator shown in Figs. 1, 2 and 3 comprises a casing including a body 10 having an inlet aperture 11 and formed with a peripheral flange 13. Located on body 10 is an upper casing 14 which is secured to the body 10 as by bolts 15.

The body 10 is provided with an outlet 16 communicating with the inlet 11 through an inlet chamber 19, valve seat 18 and outlet chamber 17.

The interior of the body 10 is separated from the interior of casing 14 by a thin resilient diaphragm 20 made of rubber or substitutes for rubber secured at its periphery in a groove 21 of body 10 and annular lip 22 of casing 14.

The diaphragm 20 is mounted flat from annular groove 21. To obtain some slack for the diaphragm, the peripheral flange 20a of the diaphragm is molded slightly larger in diameter than groove 21 so that some radially inward displacement of diaphragm material occurs when the diaphragm is secured in the groove. Additional slack is obtained by molding a thick portion 20b adjacent flange 20a, which portion 20b will be compressed and extruded inwardly when cover 14 is secured to body 10.

An annular grooved plate 23 rests upon diaphragm 20 with annular groove 24 forming a chamber in which a spring 25 is confined at one end. The opposite end of spring 25 is confined in an annular housing 26, which is urged against adjusting plate 27 by spring action. The adjusting plate 27 threadably engages threads 28 of casing 14. The annular opening 29 of casing 14 is closed as by threaded plug 30. Also provided in casing 14 is a vent 31 to enable the area above diaphragm 20 to be at atmospheric pressure. Also, should the diaphragm rupture, the gas could escape through vent 31 to atmosphere, or to other suitable means for carrying the gases away.

Diaphragm 20 is secured to stem member 32 on which is mounted a valve member 33 adapted to be seated on valve seat 18. The valve member 33 is made from rubber or substitutes for rubber.

The action of spring 25 on the diaphragm 20 is opposed by the outlet pressure in chamber 17 so that the position of the diaphragm and hence of the regulating valve is controlled by the outlet pressure, the limits being determined by adjustment of the adjusting plate 27.

In operation when the pressure in the outlet chamber 17 drops below a predetermined value, spring 25 causes the diaphragm 20 to move down, thus moving valve member 33 away from seat 18 to admit fluid from the inlet chamber 19 to increase the outlet pressure. When the outlet pressure has reached the predetermined value, the diaphragm 20 will be moved upwardly, thus positioning valve member 33 relative to seat 18 to maintain the desired outlet pressure.

When the outlet pressure in chamber 17 increases beyond a predetermined amount, the diaphragm 20 is moved upwardly to tightly seat valve member 33 at valve seat 18, thus shutting off the effect of the inlet pressure.

The diaphragm 20 is constructed of a flexible resilient substance such as rubber or the like and is provided with an opening 35 through the axis thereof which is of lesser diameter than the diameter of the stem at portion A. Thus the stem being larger than the opening of the diaphragm results in a snug sealed fitting of the diaphragm at portion A of the stem. Immediately adjacent portion A are shoulder portions 36 and 37 to maintain the diaphragm in position relative to the stem 32.

Valve member 33 is also made of flexible resilient substance such as rubber and is provided with an opening 38 being of lesser diameter than portion B of stem 32; thereby providing a snug sealed fitting of the valve member on said stem. A shoulder 39 is provided on stem 32 to resist longitudinal movement of the valve member downwardly relative to stem 32.

In assembling the valve member 33 and diaphragm 20 on stem 32, the pointed top end of stem 32 facilitates the passage of the stem through opening 38 of member 33 until the member 33 rests on shoulder 39. The pointed top end of the stem 32 is then passed through opening 35 of the diaphragm 20, until the central portion of diaphragm 20 rests on shoulder portion 37.

In the specific embodiment shown, the rubber of diaphragm 20 has a durometer of approximately 40–45; whereas in comparison, the rubber of valve member 33 has a durometer of approximately 90. Thus, the flexibility of the diaphragm is greater than that of the material of valve member 33.

To produce the desired sealing engagement of diaphragm 20 on stem portion A, the diameter of stem portion A may be .110–.115 inch with the diameter of diaphragm opening 35 being .100±.006 inch. The over-all diameter of the diaphragm may be 3.350–3.370 inches. The fitting of the valve member 33 on stem portion B is obtained by having the diameter of stem portion B at approximately .225–.230 inch with the diameter of the opening in valve member 33 being approximately .205±.01 inch.

It is noted that a tighter fit is obtained at the engagement of the valve member 33 with stem portion B than is obtained at diaphragm opening 35 and stem portion A. However, the valve member 33 must seal against higher pressures entering inlet 11, and diaphragm 20 needs only to seal against the reduced pressures existing in outlet chamber 17. Also it has been found satisfactory to use less flexible material for valve member 33 than is used in diaphragm 30 for the valve member must continually act in conjunction with valve seat 18.

Thus, it can be seen that considerable tolerance is permitted the machining of the cylindrical portions A and B of the stem 32, and that the diaphragm 20 and valve member 33 can be fitted over portions A and B respectively of stem 32, to provide a secure press fit. The longitudinal extent of openings 35 and 38 provide adequate surface of contact along portions A and B to maintain a frictional grip of these portions on the stem.

Valve member 33 being resilient, effectuates a tight closure against valve seat 18 when the valve member is moved into closed relationship with said seat by the diaphragm actuated stem.

Additionally, it is noted as pointed out in Figs. 2 and 3, that valve member 33 has a partial conical surface 40 to facilitate the seating of the valve member at valve seat 18.

Valve seat 18 is provided in an elliptical shaped member 18a, and is secured on shoulders 41 and 42 by fastener devices 34 with a resilient seal 43 provided between the body and valve seat member to prevent leakage from the inlet chamber 19 to outlet chamber 17.

In Fig. 4, I disclose a fluid pressure regulator 44 particularly adapted for fluid pressure regulation when supplied with low inlet pressure. The regulator 44 is provided with an inlet 45, an outlet 46 and a diaphragm chamber 47 communicating with inlet chamber 48 through valve seat 49 secured as by bolts 49a. As described in conjunction with the regulator of Fig. 2, the regulator of Fig. 4 is sensitive to changes in outlet fluid pressure which acts upon diaphragm 50 to position valve member 51 through operating stem 52 to maintain the desired outlet pressure. As in Fig. 1 a vent 53 is provided with regulator 44 for the chamber above diaphragm 50. The diaphragm 50 is of circular molded rubber having varying cross sectional thickness and having an annular thin flexible area as at 50a. An outer annular sealing ridge 54 is squeezed upon an assembly of upper regulator body 55 and lower regulator body 56 to extrude radially inward to furnish a controlled amount of slack to the thin flexible annual area 50a. Such a diaphragm permits economies in the molding of a flat rather than a convoluted diaphragm and also produces a flexibility at the thin annular area 50a.

Diaphragm 50 is shown provided with a bore 57 through which operating stem 52 is passed to secure the stem 52 to rubber diaphragm 50.

Also, valve member 51 is provided with a bore 58 through which operating stem 52 is passed for the securement of the valve member to the stem. To maintain the relative positioning of the stem 52 and valve member 51, projections 59 and 60 are shown integral with said stem. The securement of diaphragm 50 on stem 52 is by a stem head member 61 and shoulder 62. The diaphragm and valve member being made of rubber or the like, allows the head 61 to pass through bores 57 and 58 with the resilence of the diaphragm and valve member being such that after the passage of an enlarged portion of the stem, the valve member and diaphragm will assume their initial small diameter to grip the stem.

As the stem 52 is moved upwardly as viewed in the drawing, by increased pressure in chamber 57 acting upon diaphragm 50, the valve member 51 provided with an outwardly extending portion 51a engages valve seat 49 forming a cantilever portion to facilitate sealing the valve member as shown in Fig. 5.

The lower portion of stem 52 is shown loosely positioned in relation to the guide chamber 63 which permits the valve member 51 to be maintained within proper alignment tolerances with the seat 49.

Although I have disclosed two forms of my invention in detail, it will be understood that they may be varied, within the scope of the appended claims, without departing from the spirit of the invention.

Having thus described the invention, what I claim and desire to secure by Letters Patent of the United States is:

What is claimed is:

1. In a pressure regulator, a body having a high pressure inlet and a low pressure outlet, said body having a flexible rubber-like diaphragm mounted therein above said inlet and outlet, said body having integrally formed wall portions around said inlet, said wall portions providing an open top generally circular inlet chamber extending toward said diaphragm, a valve seat plate having a central port therein mounted on said inlet chamber wall portions, said body having a tapered stem guide in said inlet chamber in alignment with said port, said diaphragm having a central opening aligned with said stem guide and with said port, a valve stem having a tapered base portion arranged in said stem guide, said valve stem having a first cylindrical portion above said tapered base, said valve stem having a second cylindrical portion above said first-named portion and above said valve seat plate, said second cylindrical portion having a lesser diameter than the first cylindrical portion, a resilient valve closure on said first cylindrical valve stem portion, said closure member having an outer diameter exceeding the diameter of said port, said second cylindrical stem portion being inserted in said opening centrally of said diaphragm, and means to secure said valve seat plate on the open top of said inlet chamber whereby diaphragm movement opens and closes said port.

2. In a pressure regulator, a body having a high pressure inlet and a low pressure outlet, said body having a flexible rubber-like diaphragm mounted therein above said inlet and outlet, said body having an integrally formed inlet chamber around said inlet, a valve seat plate having a central port therein mounted on said inlet chamber, said body having a tapered stem guide in alignment with said port, said diaphragm having a central opening aligned with said stem guide and with said port, a valve stem having a tapered base portion arranged in said stem guide, said valve stem having a first cylindrical portion above said base, said valve stem having a second cylindrical portion above said first-named portion, said second cylindrical portion having a lesser diameter than the first cylindrical portion, a resilient valve closure on said first cylindrical valve stem portion, said closure member having an outer diameter exceeding said port, said second cylindrical stem portion being inserted in said opening centrally of said diaphragm, and means to secure said valve seat plate on the open top of said inlet chamber whereby diaphragm movement opens and closes said port.

3. In a pressure regulator, a lower regulator body, said lower body having a bottom wall, side walls and an open top adapted to be closed by a flexible diaphragm, said body having an inlet in one side wall and an outlet in an opposite side wall, said body having an annular boss formed centrally of said bottom wall, said boss opening into said inlet to provide an inlet chamber, said bottom wall having a tapered guide seat formed therein centrally of said inlet chamber, a flexible rubber-like diaphragm fixed to the open top of said lower body, said diaphragm having a thickened central portion with a bore therethrough, a valve seat plate having a valve port therein mounted on said inlet chamber, a valve stem mounted centrally of said diaphragm and depending through said port, said valve stem having a first cylindrical section at one end thereof and a second cylindrical section at the other end thereof, said first cylindrical section having a resilient rubber-like valve closure mounted thereon, said valve closure having an outer diameter exceeding the diameter of said port, said valve closure having a tapered entrance portion adapted to enter said port, said second cylindrical stem section having a diameter less than the diameter of said first cylindrical stem section and proportioned to be received by the bore through the central portion of the diaphragm, and means to secure said valve seat plate on said walls whereby said port is opened and closed by diaphragm movement.

4. In a pressure regulator, a lower regulator body, said lower body having a bottom wall, side walls and an open top adapted to be closed by a flexible diaphragm, said body having an inlet in one side wall and an outlet in an opposite side wall, said body having an annular boss formed centrally of said bottom wall, said boss opening into said inlet to provide an inlet chamber, a flexible rubber-like diaphragm fixed to the open top of said lower body, said diaphragm having a thickened central portion with a bore therethrough, a valve seat plate having a valve port therein detachably mounted on said inlet chamber, a valve stem mounted centrally of said diaphragm and depending through said port, said valve stem having a first cylindrical section at one end thereof and a second cylindrical section at the other end thereof, shoulders at each side of each cylindrical section, said first cylindrical section having a resilient rubber-like valve closure mounted thereon, said valve closure having an inner bore centrally thereof smaller than said first cylindrical section, said valve closure having a tapered entrance portion adapted to enter said seat against said port, said second cylindrical stem section having a diameter less than the diameter of said first cylindrical stem section and proportioned to resiliently fit the bore through the central portion of the diaphragm, and means to secure said valve seat plate on said walls whereby said port is opened and closed by diaphragm movement.

References Cited in the file of this patent

UNITED STATES PATENTS

| | | |
|---|---|---|
| 768,984 | George | Aug. 30, 1904 |
| 1,888,378 | Esnard | Nov. 22, 1932 |
| 1,946,188 | Birch | Feb. 6, 1934 |
| 2,629,576 | Rudolph | Feb. 24, 1953 |
| 2,662,348 | Jacobsson | Dec. 15, 1953 |
| 2,686,035 | Wuesthoff | Aug. 10, 1954 |
| 2,737,202 | Baldwin | Mar. 6, 1956 |
| 2,764,324 | Landreth | Sept. 25, 1956 |
| 2,775,983 | Johnson | Jan. 1, 1957 |

FOREIGN PATENTS

| | | |
|---|---|---|
| 33,351 | Switzerland | of 1904 |
| 876,771 | Germany | May 18, 1953 |
| 494,345 | Italy | of 1954 |